Oct. 28, 1952     P. W. NOSKER     2,616,031
TRANSMITTER FOR GUIDED AIRCRAFT CONTROLS
Original Filed Dec. 11, 1946     7 Sheets-Sheet 1

INVENTOR.
PAUL W. NOSKER
BY
HIS ATTORNEYS

Patented Oct. 28, 1952

2,616,031

UNITED STATES PATENT OFFICE 2,616,031

TRANSMITTER FOR GUIDED AIRCRAFT CONTROLS

Paul W. Nosker, Yellow Springs, Ohio

Original application December 11, 1946, Serial No. 715,595, now Patent No. 2,515,254, dated July 18, 1950. Divided and this application August 12, 1949, Serial No. 110,016

2 Claims. (Cl. 250—2)

(Granted under the act of March 3, 1883, as amended April 30, 1928; 370 O. G. 757)

The invention described herein may be manufactured and used by or for the Government for governmental purposes without payment to me of any royalty thereon.

This application is a division of application Serial No. 715,595 of Paul W. Nosker filed December 11, 1946 entitled Remote Control System, now Pat. No. 2,515,254 issued July 18, 1950, and is a continuation in part of Nosker's pending application Serial No. 494,462 entitled Aerial Torpedo.

This invention relates to a remote control system for aircraft, guided missels and the like.

In the past, various systems have been used for controlling remotely aircraft and the like. It is conventional practice when controlling target aircraft, guided missels, and test aircraft engaged in hazardous missions, to employ an automatic pilot and other automatic devices on the aircraft to maintain preset flight conditions, including predetermined variations of those conditions, such conditions being maintained by the automatic equipment in the absence of radio or other controlling signals from remote points. Remote control of such vehicles has been exercised by transmitting and receiving radio signals operating upon various elements of the automatic control systems. In the arrangements of the kind just described as belonging to the present conventional art, it will be observed that the vehicle or aircraft is actually controlled by the automatic mechanisms installed in it, and the received remote-control signals serve merely to readjust or to alter the manner of response of such automatic control devices. It is correct to say that the so-called remote control systems of this type are really automatic control systems that are subject to resetting by remote control.

Remote control equipment, as at present provided and used, imposes limitations of major consequence wherever a high degree of maneuverability is required. Such remote control systems are of the on-off or impulse type in which one or more of separately distinguishable signals may be transmitted at the discretion of the remote operator. When any given signal is transmitted, it causes a relay to close at the receiving station on the mobile vehicle or aircraft and thereby initiates an operation which continues as long as that particular signal is transmitted. The extent or distance to which that particular operation progresses depends upon the length of time of transmission of the particular controlling signal involved. In consequence, the remote pilot or the operator in present-day conventional practice manipulates push buttons or switches which are not similar to conventional airplane controls and further, the remote pilot or operator has no direct control over the motions of the elevator, rudder, or ailerons on the aircraft. Furthermore, conventional systems have inherent time lags which are highly undesirable when abrupt or extensive maneuvers must be performed.

The present system of remote control is intended for and is particularly adapted to the flight testing of military aircraft or missels to extreme limits of airspeed, acceleration or other flight parameters. The present remote control system is intended to be sufficiently versatile to permit attainment of every flight condition and attitude of which an airplane or missile is capable.

In consequence of the fact that these objectives seem to be unattainable by the usual remote control systems or their ordinary modifications, I have provided a system which is different from the conventional in the following respects:

a. The desired maneuvers of the missile or the like and their manner of execution are less limited by my system of remote control than by the characteristics of the missile or other aircraft, itself.

b. The remote control system which I have provided will work well in any controlled airplane or guided missile having airplane-type controls, regardless of the peculiarity of the flight characteristics of that airplane or missile.

c. The remote control system is a natural one in which the remote pilot or operator performs his usual functions in the accustomed manner.

d. A proportional control system is incorporated, by which received signals establish directly the position of each control element on the controlled aircraft.

e. The total system preferably includes two separate television channels by which the human pilot in a simulated cockpit in the remote control station receives an image of the forward view from the controlled airplane or missile and an image of an instrument panel on the controlled airplane. In this way, it may be said that the remote control pilot actually flies the aircraft or missile being flown by remote control on instruments in the same manner that he would do if he were situated on that controlled aircraft. It is therefore possible to perform safely the first flights of an aircraft under full remote control.

One object of the present invention is to provide a remote control apparatus which is not dependent upon or sensitive to the particular flying characteristics of the aircraft to be controlled. When such a system is provided, the remote control receiving system can be transferred from one aircraft to another and will function well in any flying vehicle having effective controls provided the control limits are first suitably adjusted. No other adjustment is necessary and neither is preliminary testing required to accommodate the new installation to the flight characteristics of the particular aircraft involved.

A second object of the invention is to provide such controlled equipment on the aircraft that it will always be able to cope properly with unusual flight conditions or situations. In contrast, automatic pilot controls in use at present cannot be relied upon to effect successful recovery from intentional or inadvertent spins.

A third object is to provide a control system which can function throughout a full 360° of either roll or pitch. Present-day gyroscopic automatic pilots of the attitude or position type are unable to function throughout such a complete range.

A fourth object is to provide a system in which the positioning of a control on a power-driven controlled aircraft by a signal receiving station mounted thereon is dependent upon relative amplitudes of frequencies of two different signals simultaneously transmitted from a signal transmitter station, the amplitude ratio of the two signals being variable at the will of the operator at the transmitting station.

In the drawings:

Fig. 3a is a plan view of one form of the transfer switch 121;

Fig. 8 is a block and schematic diagram of another embodiment of the receiving station circuit shown in Fig. 2;

Figure 11:
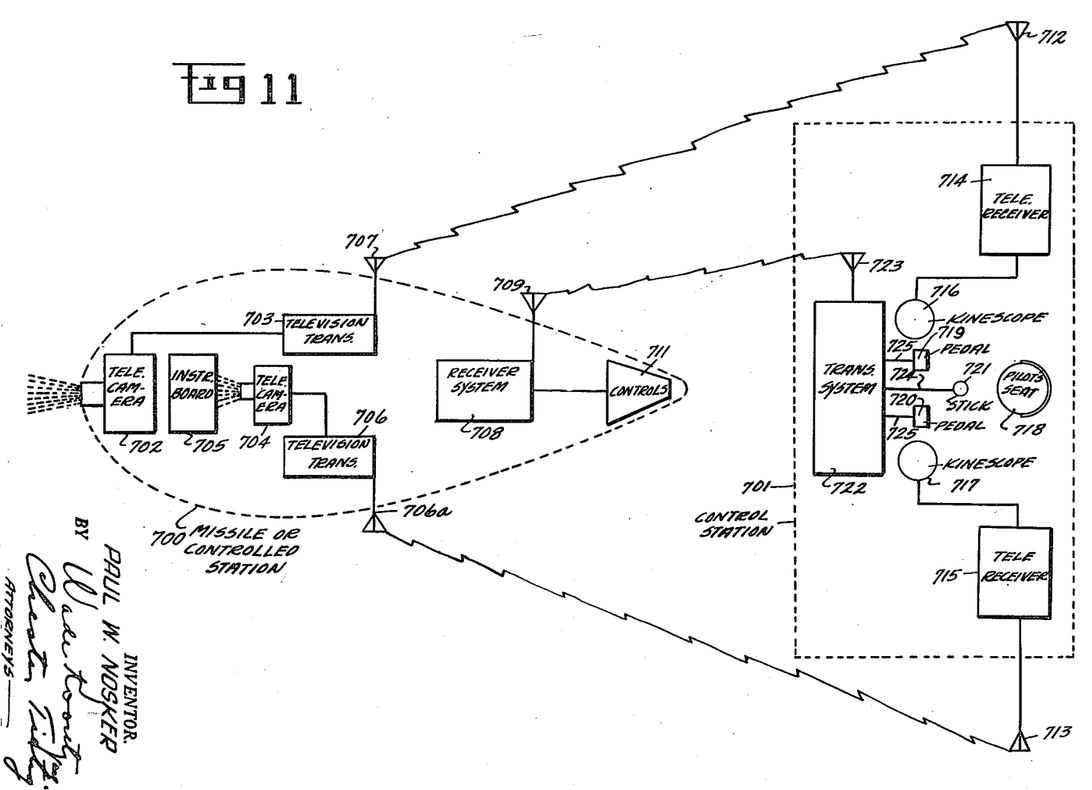
Fig. 11 is a block and schematic diagram showing the over-all system and the interrelations between the control and controlled stations, especially the relations of the radiant energy channels to the remote pilot or operator.

In Fig. 11, 700 is the missile, airplane or other control station. 701 is the ground or mobile control station which may be airborne. A television camera 702 is located within the missile, preferably in the nose, where it may have a clear view ahead. Its output is delivered to a television transmitter 703 from whence it is beamed or broadcast from an antenna 707 to the control station 701. A second television camera 704 is disposed to view an instrument board 705, the dials of which show the flight and operating conditions aboard the missile 700. The output of camera 704 is delivered to a television transmitter 706, from whence it is beamed or broadcast from an antenna 706a to the control station 701. A receiving system 708 is provided with an antenna 709 and is connected to actuate the missile flying controls 711.

In the control station 701, an antenna 712 intercepts signal from the television transmitter 703 and a second antenna 713 intercepts signal from the television transmitter 706. Television receivers 714 and 715 are connected to antennas 712 and 713, respectively, and kinescopes 716 and 717 are connected respectively to television receivers 714 and 715. A pilot's seat 718 is disposed within easily visible range of the kinescopes and within conventional distance and position from pedals 719 and 720 for actuating the rudder. A conventional control stick 721 is provided for aileron and elevator functions. Pedals 719 and 720 and stick 721 are each connected to a transmitting system 722 which is arranged to radiate signal from antenna 723. The signals shown as being radiated from antenna 723 may be either radio or other radiant light waves. Appropriate receivers in the control station are used in each case.

Figure 1:
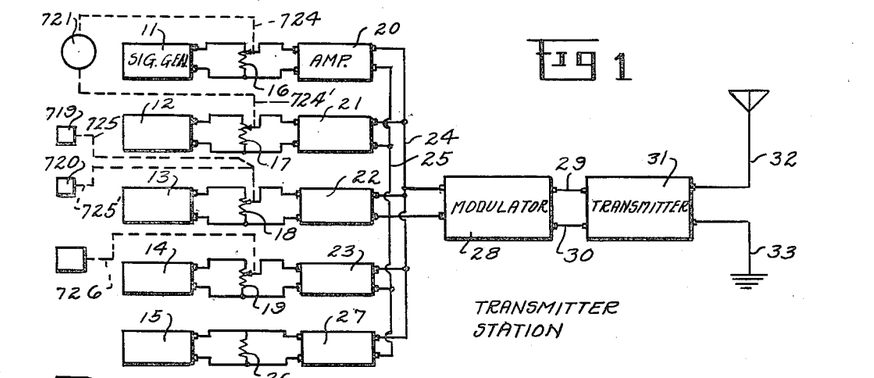
Fig. 1 is a block and schematic diagram of a circuit at a signal transmitting station.

Referring to Fig. 1, a control station indicated in Fig. 11 as control station 701 is shown and has five signal generators 11, 12, 13, 14, and 15, each signal generator producing electrical impulses which may be pure sine waves, these being of constant amplitude and each having a different constant frequency. The outputs of the signal generators 11, 12, 13, and 14 are fed to variable attenuators or potentiometers 16, 17, 18, and 19, respectively, and then through amplifiers 20, 21, 22, and 23, which are respectively connected in parallel to leads 24 and 25. The output of the signal generator 15 is fed through a fixed attenuator 26 and amplifier 27 to leads 24 and 25. Leads 24 and 25 provide input for a modulator 28 which is connected through leads 29 and 30 to a radio transmitter 31 having the usual connections with an antenna 32 and a ground 33 so that the signals may be impressed upon a radio frequency carrier wave for transmission into space.

Fig. 1 is intended to show the basic transmission circuit at the transmitter station. The dashed lines 724, 724' in Fig. 1 represent mechanical linkages between the control stick 721 and the potentiometers 16 and 17. Dashed lines 725 and 725' represent a mechanical linkage between the rudder pedals 719 and 720 and potentiometer 18. Dashed lines 726 represent a mechanical linkage between a throttle control and the potentiometer 19. The relation of these controls to the transmitter is indicated in Fig. 11 with the exception that the throttle control is not shown.

Figure 2:
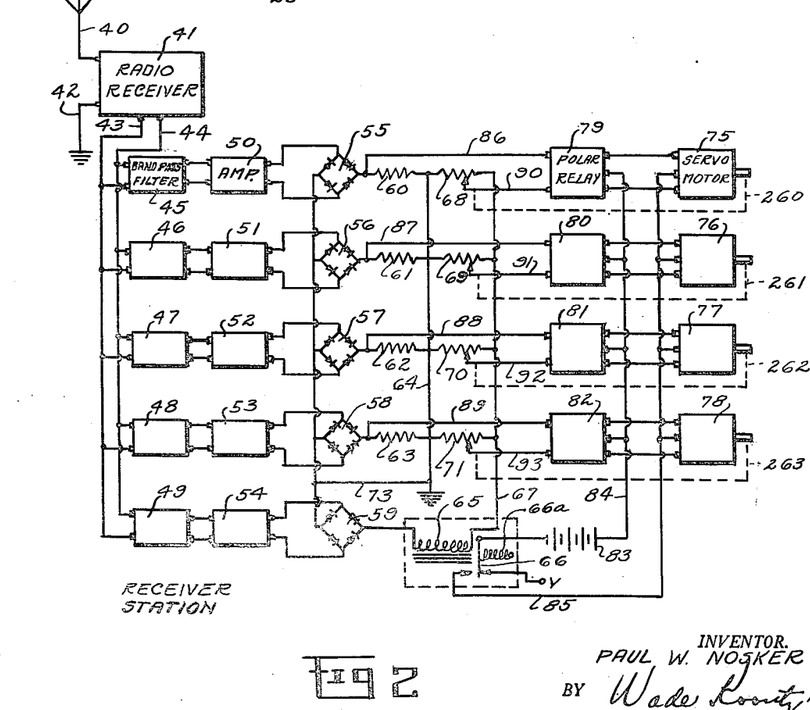
Fig. 2 is a block and schematic diagram of a control-operating circuit at a signal receiving station for receiving and operating controls in response to signals radiated from the signal transmitting station shown in Fig. 1.

Fig. 2 shows a circuit at the control station or missile indicated as 700 in Fig. 11. Receiving antenna 40 at the control station is coupled to a radio receiver 41 having a ground 42. Receiver 41 is connected by leads 43 and 44 to band pass filters 45, 46, 47, 48, and 49, arranged in parallel. The band pass filters 45 to 49, inclusive, are tuned to pass signals of the respective frequencies of the signal generators 11 to 15, inclusive. Combined signals received by the antenna 40, after demodulation by a receiver 41, are separated or channeled by the band pass filters 45 to 49, inclusive, and are then amplified by amplifiers 50, 51, 52, 53, and 54, respectively, which are connected to the band pass filters. Other irreversible and linear devices may be used in place of amplifiers. If desired, amplifiers may be used also on the receiving sides of the band pass filters. The outputs of the several amplifiers 50 to 54, inclusive, are delivered to rectifiers 55, 56, 57, 58, and 59, which are here shown as of the full-wave dry-disc type. Rectifiers 55, 56, 57 and 58 are each directly connected to a fixed load circuit, here represented by resistances 60, 61, 62, and 63, respectively. The resistances 60 to 63, inclusive, are connected in series with the potentiometers 68 to 71, inclusive. The junction of each of the fixed resistors 60 to 63, inclusive, with the potentiometers 68 to 71, inclusive, are grounded by a common lead 64. The latter also provides ground for all the rectifiers 55 to 59, inclusive, through its connection to leads 72 and 73. The output of rectifier 59 is applied to the output ends of the resistors of potentiometers 68 to 71, inclusive, and preferably with a relay winding 65 in series therebetween. Each of the resistors 60 to 63, inclusive, is connected at its ungrounded end to a coil terminal of one of the relays 79 to 82, inclusive. The other coil terminal of each of relays 79 to 82, inclusive, is connected with a tap that is variably adjustable on one of the potentiometers 68 to 71, inclusive. The positive terminal of a battery 83 is applied to each of the polar relays 79 to 82, inclusive. The function of relays 79 to 82, inclusive, is to make and break contact and to determine the direction of current flow in circuits energizing a plurality of servomotors 75 to 78, inclusive.

Figures 3, 4, 5, 6:
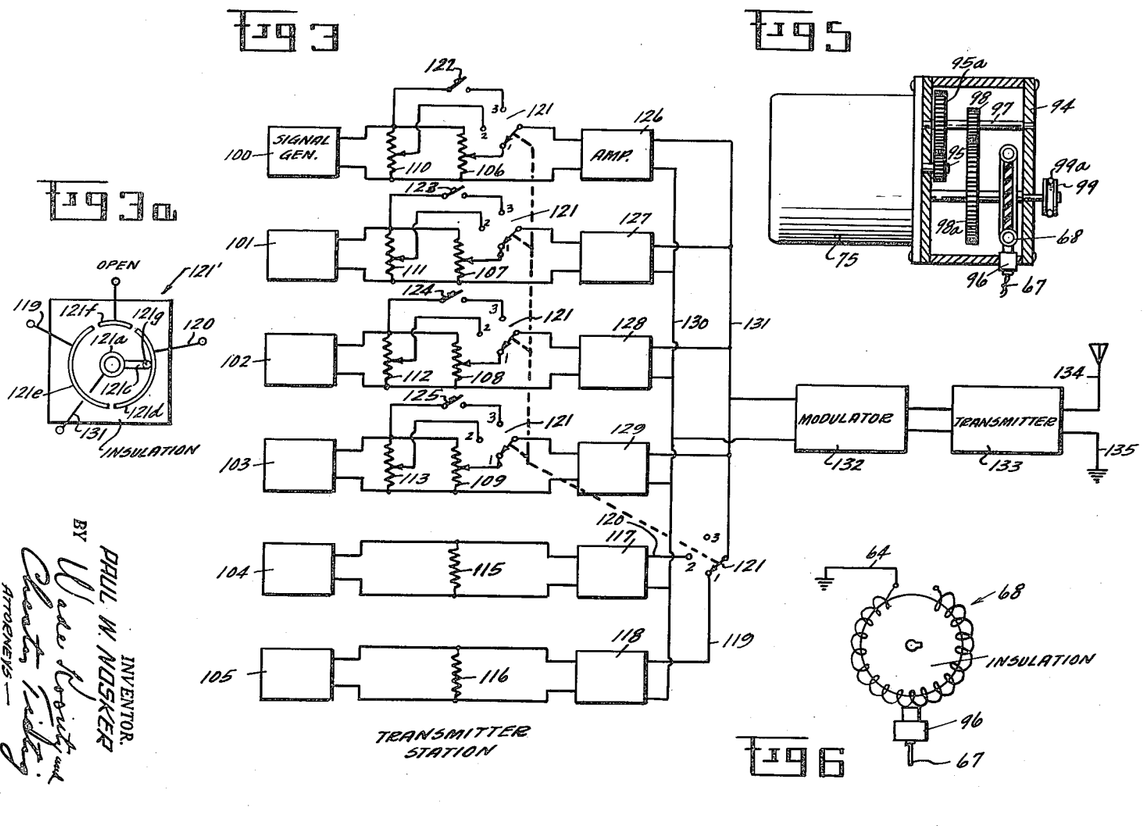
Fig. 3 is a block and schematic diagram of a modified circuit for the signal transmitting station.
Fig. 4 is a block and schematic diagram of another embodiment of a circuit for the signal receiving station adapted to be used with the transmitter station circuit which is shown in Fig. 3.
Fig. 5 is a lateral elevation of a servomotor and a sectional elevation of a gear train housing showing a gear train and a position-selecting potentiometer in section therein and a power take-off disposed outwardly of the housing and operated by the gear train.
Fig. 6 is a diagrammatic elevation of the potentiometer shown in Fig. 5.
Figure 4:
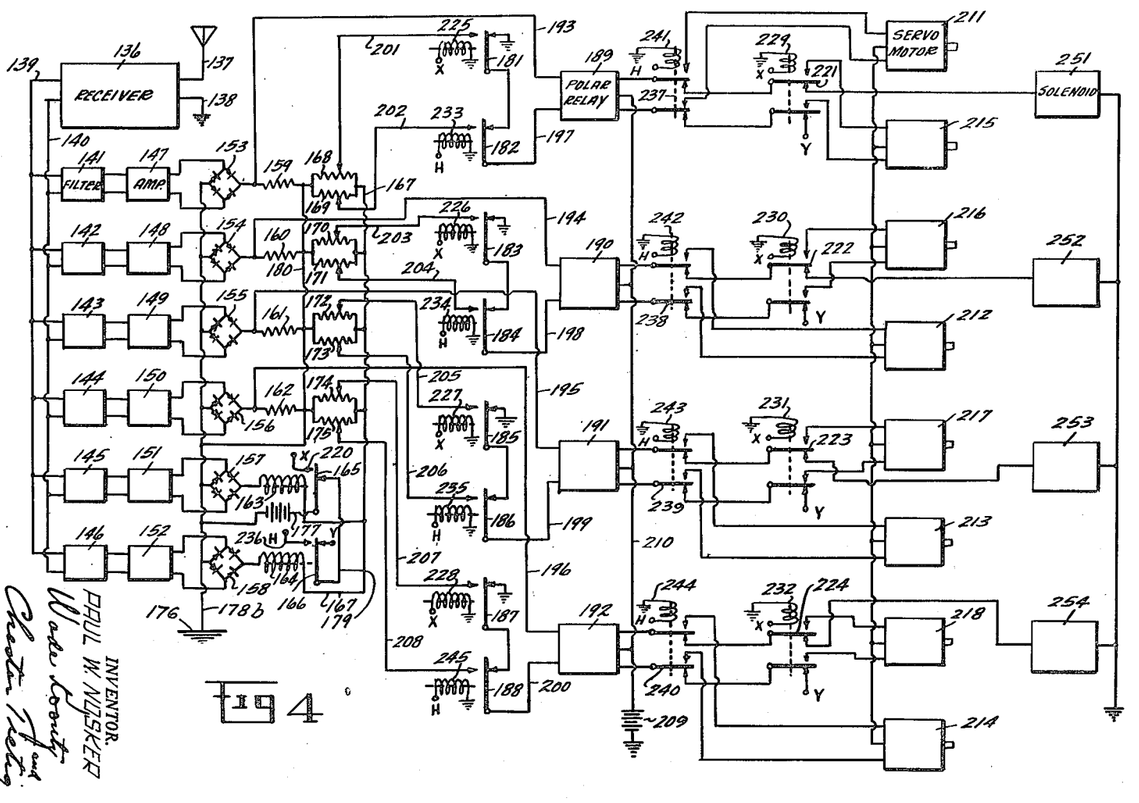

Reversible electric servomotors 75, 76, 77, and 78 are each mechanically connected with one of the missile control members such as rudder, elevator, throttle, etc. of the aircraft or other vehicle which it is desired to control. The mechanical connections with the movement of potentiometers, are shown by dashed lines in Fig. 2, as 260 to 263, inclusive. These connections are also shown in pictorial presentation in Figs. 5 and 6. These servomotors are also arranged to drive the potentiometers 68, 69, 70, and 71 over a stationary contact 97, as shown in Fig. 5. The details of this construction are explained below.

These servomotors are electrically connected with bi-directional, polarized center-off relays 79, 80, 81, and 82, respectively, and are connected in parallel with a source of electrical energy, e. g., a battery 83. The negative side of battery 83 is normally connected by reason of the pressure of a spring 66a to a movable contact, open circuited at terminal Y in Fig. 2, of relay 66. Lead 84 connects the positive side of the battery 83 with relays 79, 80, 81, and 82. A lead 85 connects the negative side of the battery 83 through relays 66 with all four servomotors 75 to 78, inclusive, when the relay winding 65 is energized by the passage of signal through the band pass filter 49. Any sufficient difference of potential at the coil terminals of relays 79, 80, 81 and 82 causes the relay armature to close in one direction or the other to move the corresponding control accordingly. The position of the electrical null point on each potentiometer at any particular time determines the control setting that will be accomplished.

To effect a change in the position of electrical null point on any of the potentiometers 68, 69, 70, or 71, in the signal receiving station, hence, to control proportionally the missile or airplane through a servomotor, it is necessary only to adjust one of the variable attenuators 16, 17, 18, or 19, in the signal transmitting station shown in Fig. 1, in order to vary the amplitude of the transmitted signal for the channel involved. If an attenuator in the signal transmitting station is shifted to increase the amplitude of a certain transmitted signal, the servomotor that is controlled, as described, by that signal, will operate in such a direction as to move the contact of the potentiometer in the signal receiving station nearer to the ungrounded side of that potentiometer. Conversely, if the attenuator is readjusted to reduce the amplitude of the same transmitted signal, the servomotor will operate in the opposite direction.

In the preferred method, the several signal generators 11, 12, 13, and 14 are adjusted to have equal amplitudes of output voltage, and the modulator 28 is arranged to effect 100 per cent modulation of the radio frequency carrier wave when each attenuator or potentiometer 68 to 71, inclusive, is set for maximum amplitude of transmitted signal. The receiving system of Fig. 2 is so adjusted that the voltage across each potentiometer is at every instant equal to the voltage that would exist simultaneously across any of the load resistors 60, 61, 62, and 63, if the corresponding attenuator in Fig. 1 were set for maximum amplitude of transmitted signal.

Additional relays such as relay 66, Fig. 2, may be incorporated in one or more of the channels to accomplish other controlling functions of an "on-off" or stepping type. Furthermore, by employing selectively any one of several standard frequencies for the constant amplitude reference signal, using relays in the relative position of relay 66 to switch the polarized relays to different sets of servomotors and potentiometers for each case, it is possible to shift from one group of controls to another and thus to accomplish settings of many different controls in rapid succession.

Now referring to Fig. 3, this figure shows a transmitter circuit at a control station indicated as 701 in Fig. 11. This station is more elaborate than that of Fig. 1 and is capable of a greater extent of control. The signal generators 100, 101, 102, 103, 104, and 105, are like signal generators 11 to 15, inclusive, in Fig. 1, but the arrangement is such that the first four signal generators send signals into channels controlled by variable attenuators or potentiometers 106, 107, 108, and 109, or alternatively, by the variable attenuators or potentiometers 110, 111, 112, and 113, or by pulsing switches 122 to 125, inclusive. Signal generators 104 and 105 send signals or pulses of constant but differing frequencies through fixed attenuators 115 and 116, respectively, and then through amplifiers 117 and 118, respectively, the output from which go through leads 119, and 120 to the terminals of a three-point switch 121.

As the circuit is shown, the output of the signal generator 105 is being taken, by turning switch 121 to contact 2, the output of signal generator 104 may be taken, or by turning the switch further to open-circuited contact 3, no signal from either generator 104 or 105 is taken. Switch 121 is a five-deck switch and the resulting contacts of its separate decks are numbered identically. With switch 121 in the number 1 position, variable potentiometers 106, 107, 108, and 109 are connected. With switch 121 in the number 2 position, variable potentiometers 110, 111, 112, and 113 are connected. With the switch 121 in the number 3 position, no output from signal generators 104 and 105 is taken, the signals in the first four channels are controlled by on-off keys or switches 122, 123, 124, and 125. The first four channels feed signals to amplifiers 126, 127, 128, 129. The fifth and sixth channels feed signals to amplifiers 117 and 118. All six amplifiers are connected in parallel to a lead 130. Another lead 131 is connected to amplifiers 126, 127, 128 and 129 in parallel, and to the movable arm of switch 121. A modulator 132 receives its input from the leads 130 and 131. It transmits them to a radio transmitter 133 having the usual antenna 134 and ground 135. Additional amplifiers may be interposed between the signal generators and the potentiometers or attenuators if desired.

Referring to Fig. 4, the controlled station indicated as 700 in Fig. 11 has a radio receiver 136 with antenna 137 and ground 138. The audio or super audio signal from radio receiver 136 is conducted through leads 139 and 140 in parallel to a series of frequency-selective filters 141, 142, 143, 144, 145, and 146, which individually pass frequencies corresponding to one of those originating in signal generators 100, 101, 102, 103, 104, and 105 in Fig. 3. Signal passed by the individual band pass filters is conducted separately to amplifiers 147, 148, 149, and 150, 151 and 152 and then to full wave rectifiers 153, 154, 155, 156, 157, and 158 respectively. The resulting signals from the output sides of the first four rectifiers, which are in the primary control channels of the system, are fed to the load circuits represented by resistors 159, 160, 161, and 162. On the other hand, outputs from rectifiers 157, and 158 pass through solenoid windings 163 and 164, respectively, of relays 165 and 166, and then by means of the lead 167, which is connected to both relay windings, the outputs are conducted to the load circuit composed of eight variable follow-up potentiometers 168 to 175, inclusive. The potentiometers are connected in parallel. Two of the potentiometers are used for each of the four primary control circuits. A ground wire 178b connects all six rectifiers 153 to 158, inclusive, to ground 176, and the battery 177 has its positive terminal connected to relay 165, while its negative terminal is connected by leads 178a, and 178b to ground 176. A lead 179 provides an electrical connection between a contact of relay 166 and a contact of relay 165. A lead 180 is connected between each of the resistances 159, 160, 161, and 162 and the pairs of variable potentiometers 168 to 175, inclusive, and is connected by lead 178b to ground 176.

Switching relays 181 to 188, inclusive, are connected in pairs into the four primary control channels mentioned above. These switching relays are energized in groups by battery 177 depending upon the settings of relays 165 and 166, as will be hereinafter more fully explained. The switching relays 221 to 224, inclusive and 241 to 244, inclusive, are ganged in pairs and are normally spring pressed downward.

Insofar as Fig. 4 is concerned, the groups of relays that are energized simultaneously, consist of four each. The groups are distinguished by their being connected to a common contact junction marked either X or H. The contact 220 of relay 165 is also marked X and the contact 236 of relay 166 is also marked H. Relays X are energized through contact 220 (X) and relays H are energized by contact 236 (H). Relay windings X and contact 220 are always in conjunction; likewise, relay windings H and contact 236 are always joined. Switching takes place through the relays 165 and 166, respectively.

It is only due to the complexity of the Fig. 4 diagram that connections between the relays X and the point X and the relays H and the point H cannot be shown without making the rest of the diagram unduly complex. The letter Y designates open circuited contacts.

Polarized center-off relays 189, 190, 191, and 192, one for each primary control channel, are respectively connected by leads 193, 194, 195, and 196, in their respective control channels to the junctions of the particular rectifier and the load circuit within that channel. The other input terminals of the polarized relays 189 to 192, inclusive, are connected by leads 197, 198, 199, and 200, respectively, to switching relays 182, 184, 186, and 188. Leads 201 to 208, inclusive, connect all eight switching relays with the movable contacts of the eight variable potentiometers 168 to 175, inclusive. A battery 209, having its negative side grounded, is connected by a lead 210 to the armatures of polarized relays 189 to 192, inclusive.

When a signal or pulse passes filter 145 and flows through the channel containing relay 165, it closes relay 165 to the left against contact 220 and applies the positive potential of battery 177 to the junction X and energizes the relay windings 225 to 232, inclusive. The energization of the relay windings 225 to 228, inclusive, causes the relays 181, 183, 185, and 187 to close toward the left. The energization of the relay windings 229, 230, 231, and 232 causes the relays 221, 222, 223, and 224 to close upwardly. The closing of relay 181 toward the left causes a signal to pass from the tap on potentiometer 168 through the relays 181 and 182, which are spring pressed toward the right, to the lower coil terminal on polarized relay 189. In like manner, upon the closing of the other relays 183, 185, and 187 toward the left, the respective channel signals are passed to the lower coil terminals on the polarized relays 190, 191, and 192. The polarized relays 189 to 192, inclusive, control, by means of battery 209, the reversible servomotors 215, 216, 217, and 218, respectively, which are mechanically linked as shown in Fig. 5 to the corresponding potentiometers 168, 170, 172, and 174. Thus, when the standard or reference signal is taken from signal generator 104 (Fig. 3) by closing switch 121 against contact 2, the potentiometers 110, 111, 112 and 113 control the servomotors 215, 216, 217 and 218, respectively.

Similarly, the switching relays 181 to 188, inclusive, are controlled by relays 165 and 166 so that when a signal exists in the channel containing relay 166, the polarized relays 189, 190, 191, and 192 are connected to the movable contacts on the respective potentiometers 169, 171, 173, and 175, which then control the switching relays 237, 238, 239, and 240. The polarized relays 189 to 192, inclusive, control, by means of battery 209, the reversible servomotors 211, 212, 213, and 214, respectively, which are mechanically linked, as shown in Fig. 5, to the corresponding potentiometers 169, 171, 173, and 175. Thus, when the standard or reference signal is taken from signal generator 105 (Fig. 3) by turning switch 121 to position 1, the potentiometers 106, 107, 108, and 109 control the servomotors 211, 212, 213 and 214 respectively.

When switch 121 is closed on position 3 (Fig. 3), the keys 122, 123, 124 and 125 may be used to transmit one or more impulses in succession. The control system of Fig. 3 differs from that of Fig. 1 primarily in the fact that it offers control of a greater number of functions. The system of Fig. 1 incorporates a single standard signal and four separate controlling signals that are adjustable in amplitude at the discretion of a pilot or operator and therefore, the system is adaptable to the continuous proportional control of four separate functions. The transmitting system of Fig. 3 employs four similar controlling signals, but it has two separate standard signals either one or neither of which may be transmitted, depending upon the setting of transfer switch 121. When that switch is in position 1, the standard signal from the signal generator 105 is fed to the modulator 132 and is then transmitted by the radio transmitter 133. When the switch 121 is in its position 1, the controlling potentiometers 106, 107, 108, and 109 are in the circuits of signal generators 100, 101, 102, and 103, respectively. When switch 121 is in its position 2, the standard signal from signal generator 104 is substituted for that from signal generator 105, and also the controlling potentiometers 110, 111, 112, and 113 are substituted for those previously mentioned in the respective circuits of signal generators 100, 101, 102 and 103. Finally, when switch 121 is in its position 3, neither one of the two available standard signals is transmitted and none of the controlling potentiometers is in circuit. Instead, the switches 122, 123, 124, and 125 provide on-off control of transmission of the respective controlling signals from signal generators 100, 101, 102 and 103. When switch 121 is in position 3, there is no modulation signal transmitted from the system unless and until one or more of the switches 122, 123, 124 and 125 are closed by the operator.

The remotely controlled system of Fig. 4, indicated as 708 in Fig. 11, is intended for use in conjunction with the transmitting system indicated as 722 in Fig. 11 and shown in Fig. 3. In Fig. 4, the filters 141, 142, 143, and 144 are adjusted to pass the four principal controlling frequencies that are generated at the transmitting system. The filters 145 and 146 are adjusted to pass the two separate standard signals, either one, but not both of which may be received at any given time depending upon the setting of a certain switch at the transmitting station. There are three separate conditions of operation to be considered, as follows:

a. Standard signal is being received on the frequency of filter 145, but no signal is being received on the frequency of filter 146;

b. Standard signal is being received on the frequency of filter 146, but no signal is being received on the frequency of filter 145;

c. No signal is being received on either the frequency of filter 145 or the frequency of filter 146.

In the case (a) above, the signal passing through filter 145, after amplification and rectification, passes as direct current through the actuating coil 163 of relay 165 and thence through the follow-up potentiometers 174 and 175, which are connected in parallel to the return or ground circuit. This rectified signal current causes the relay 165 to close to the left, thus connecting battery 177 to the inner relay contact 220. Contact 220 is connected to the actuating coils 225, 226, 227, 228, 229, 230, 231, and 232 of each of the relays 181, 183, 185, 187, 221, 222, 223, and 224, all of which are switching relays that serve to determine which of the servomotors or actuating devices will be controlled under this operating condition.

Description of the controlling operation will be limited to the control function represented by the signal frequency of filter 144 which will be seen to communicate with the polarized center-off relays 192 and the servomotor 214 or 218 or the solenoid 254. With relay 165 closed to the left in a manner just stated, the switching relay 187 also closes to the left and thus connects the polarized relay 192 to follow-up potentiometer 174. Also, the closing of relays 165 to the left, causes the switching relay 224 to close upwardly and thus connects the output terminals of relay 192 to the reversible servomotor 218. Thus, the follow-up potentiometer 174 and the servomotor 218, which are mechanically linked together, are controlled by the signal passing the filter 144 when the standard signal through filter 145 is being used. For the condition of standard signal at filter 146 and no signal at filter 145, described above in (b), there is no signal on the frequency of filter 145 and therefore the relay 165 and all other switching relays controlled by it are open. However, if there is a standard signal received on the frequency of filter 146, and that signal closes switching relay 166, the terminal H of relay contact 236 is connected with the battery 177. When the relay 165 is closed toward the right by spring pressure and when signal is passed through filter 146 to energize relay winding 164, relay 166 is closed toward the left. The positive potential of battery 177 is then applied to the H terminal of contact 236. The contact H is common to contact 236 and to the relay windings 233, 234, 235, 241, 242, 243, 244, and 245, all of which are therefore energized from the positive potential of battery 177. All contacts Y are open.

The closing of relay 188 connects the energizing coil of the polarized center-off relay 192 to the follow-up potentiometer 175, and closing of the switching relay 240 connects the output contacts of the same relay 192 to the reversible servomotor 214. Thus, the follow-up potentiometer 175 and the servomotor 214, which are mechanically connected together, are controlled by the signal on the frequency of filter 144 when the standard signal through filter 146 is being used. It will therefore be apparent that upon the simultaneous reception of signals passing filters 144 and 146, the servomotor 214 may be caused to perform mechanical work such as the adjustment of a control upon the missile or the like.

Under the conditions described above in subparagraph (c), there is no signal on either the frequency of filter 145 or that of filter 146, and therefore the switching relays resume their spring-pressed positions with the relays 165 and 166 open circuited. It will be noted that in this case, the polarized, center-off relay 192 is connected across the load resistor 162 and ground and is not associated with either of the follow-up potentiometers 174 or 175. Also, the uppermost one of the three output contacts of relay 192 is connected through switching relays 240 and 224 to solenoid 254. Under this condition, the relay 192 remains open at all times when no signal is being received on the frequency of filter 144, and the solenoid 254 is thus deenergized. However, when a signal is received on the frequency of the filter 144, the potential difference that is developed across the resistor 162 serves to close relay 192 in the up direction, thus connecting battery 209 to the solenoid 254.

In this particular condition of operation, there is no proportional control feature involved because the solenoid is either energized or deenergized, with no intermediate conditions or positions provided. The solenoid 254 may be used to operate any lever- or other two-position device such as a stepping switch, valve, or other mechanism.

Battery 209 energizes either the servomotors or the solenoids depending upon the position of relay 244 and the position of relay 224 and 192. The flow of energy to these relays is controlled through filters 145 and 146. When the armature of relay 192 is energized, the relay 244 or 240 is connected to relay 192 either one way or the other. The positive terminal of battery 209 is closed upwardly and the contacts X and H are deenergized. Then battery 209 can energize solenoid 254. When contacts X and H are deenergized, relay 192 cannot close downwardly. The lower coil terminal of relay 192 is grounded through the deenergized relays 187 and 188 since the polarity of the voltage applied to the upper coil terminal cannot be reversed because of the fixed manner of connection of the rectifier 156. The upper coil terminal is connected with the positive terminal of load resistor 162. Relays 189 to 192 act as one-way relays when terminals X and H are both deenergized. For example, when X is energized and H is not energized, the lower coil terminal of relay 192 is connected to the movable contact of the potentiometers 174. The armature of relay 192 can now close in either direction. If it closes upwardly, the positive terminal of battery 209 is connected through upper armature of relay 244 to the upper armature 224 of relay 232 and thence to the upper power input terminal of motor 218. When relay 192 closes downwardly, the positive terminal of battery 209 is connected through the lower armature of relay 244 to the lower armature of relay 232 thence to the lower power input terminal of motor 218. When terminal H is energized and terminal X is not energized, the relay 192 acts as a polarized, center-off relay because its lower coil terminal is connected to the movable contact of potentiometer 175 through relay 188. When relay 192 is closed upwardly, the positive terminal of battery 209 is connected through the upper armature of relay 244 and thence to the upper power input terminal of motor 214. When relay 192 is closed downwardly, the positive terminal of battery 209 is connected through the lower armature of relay 244 to the lower power input terminal of motor 214. Terminals X and H cannot be simultaneously energized, because the standard signals on the frequencies of filters 145 and 146 are never transmitted simultaneously. See switch 121 on the transmitter (Fig. 6).

It is to be understood that the servomotors are all provided with split field windings (not shown) so that energization of one terminal will produce the opposite direction of rotation from that produced by energization of the other terminal.

In Fig. 4, due to the complexity of the diagram, it is impossible to show the mechanical linkages which exist between the servomotors and the potentiometers without making the remainder of the diagram unduly complex. Such linkages connect servomotors 215, 211, 216, 212, 217, 213, 218, and 214 with potentiometers 168, 169, 170, 171, 172, 173, 174, and 175, respectively.

Referring now to Figs. 5 and 6, the nature of the mechanical linkage between a reversible servomotor and a potentiometer is illustrated. A servomotor 75 is bolted to a gear box 94, which contains a driving pinion 95, which is in mesh with a larger gear 95a, mounted on a countershaft 97. A smaller gear 98 on countershaft 97, drives a larger gear 98a on a second countershaft 97a which projects from the forward end of the gear box 94. On the projection is mounted a groove pulley or reel 99 and its associated cable 99a. Just within the case is mounted the potentiometer 68 which is essentially a resistance coil mounted on a circular insulator and making contact with a spring-pressed brush 96 in a stationary brush holder mounted in the floor of the box 94. The potentiometer 68 is driven by the countershaft 97a.

In this arrangement, the total angular movement of the coil of the potentiometer 68 is equal to the total angular movement of the control cable reel 99. An arrangement in which the potentiometer would be stationary and the contacts movable would be the full equivalent of the above combination.

The remote control system represented by the transmitting system of Fig. 3 and the receiving system of Fig. 4 provides an additional group of four proportional controls for setting the trim tabs, cowl flaps or other auxiliary devices on the missile, test airplane or the like. These controls must be accurately positioned, but do not require continuous attention or adjustment by the remote pilot. This particular embodiment of the invention, which also includes the on-off switches or keys 122, 123, 124, and 125 which operate the solenoids 251, 252, 253, and 254 on the controlled missile. These on-off or step-function controls are provided for the operation of landing-gear retraction and extension, dive-brake opening and closing, the turning on and off of cameras or other special devices on the missile or airplane, and for any other functions that have only two positions or conditions of operation.

In the preferred manner of application, one of the solenoids on the missile is used to actuate a chain of lock-in relays or a stepping switch of the type commonly employed in automatic telephone exchanges; another solenoid is used to reset the relay chain or stepping switch to the "home" position; a third solenoid is used to energize the particular step function selected in the positive direction and the remaining solenoid is used to operate the selected step function in the negative direction. To illustrate the manner of use of this feature of the total control system, let it be supposed that on a particular installation, the landing-gear retracting mechanism is connected to the third position of the relay chain or stepping-switch. To actuate the landing gear retracting mechanism, the remote pilot will close and open three times the stepping switch that controls the first solenoid on the missile or aircraft and will thereby advance the relay chain or stepping switch to its third position. If he then desires to retract the landing gear, he will close the actuating switch that controls the third solenoid on the missile or airplane. Such closing will cause positive direction of operation of the selected step function.

On the other hand, if he desires to lower the landing gear, he will close the actuating switch for the fourth solenoid. Such closing will accomplish negative direction of operation of the selected step-function. After completion of the desired operation, the remote pilot will close his second step-function switch, thereby energizing the second solenoid on the airplane and returning the relay chain or stepping switch to its "home" position. A step function system of the type just described, incorporating four on-off switches or two double-throw switches at the remote control transmitting station and four cooperating solenoids on the remotely controlled airplane may be used to control as many separate step functions as desired. The number of such functions available for control is limited only by the number of discrete steps in the relay chain or the stepping switch on the test airplane.

It will be seen that the transmitting system of Fig. 3 is capable of controlling selectively two separate groups of four each proportional controls and one set of four each on-off or stepping controls. There are two different ways in which the transfer switch 121 can be utilized which are as follows:

a. It can be manually set by the controlling pilot, who would thus select the particular group of functions desired to be controlled at any time, or;

b. The form shown in Fig. 3a can be continuously and automatically driven through its several positions by a motor or other continuously-acting device, thus to provide automatic sampling of each of the separate control groups at regular intervals.

With rapid action of the switch 121, the system can be made to display for all particular purposes, continuous availability of all twelve of the separate control operations. The switch may be mechanically actuated in the manner just mentioned or it may consist as an equivalent of a wholly electronic device in which electronic "gates" are opened and closed in predetermined sequence by a controlling oscillator or pulse generator.

Referring now to Fig. 3a, the switch 121 may comprise in each one of its decks a plate-like circuit 121b which is made from an insulating material such as a plate of synthetic resin. Mounted centrally therein for rotation is a shaft 121a which may be driven by a separate electric motor, not shown. Attached to the shaft 121a is a rotating arm 121c which bears at its outer end a small wheel 121g. The wheel 121g is arranged to make contact with at least three open segments 121d, 121e and 121f, respectively, that are vertically mounted upon the base plate 121b. Lead 120 connects with segment 121d; lead 131 connects with the shaft end of the movable arm 121c and lead 119 connects with the segment 121e. The segment 121f is an open contact. Rotation of the arm 121c, therefore makes successive contacts with the segments after the manner of the commutator or distributor of an automobile engine.

Figure 7:
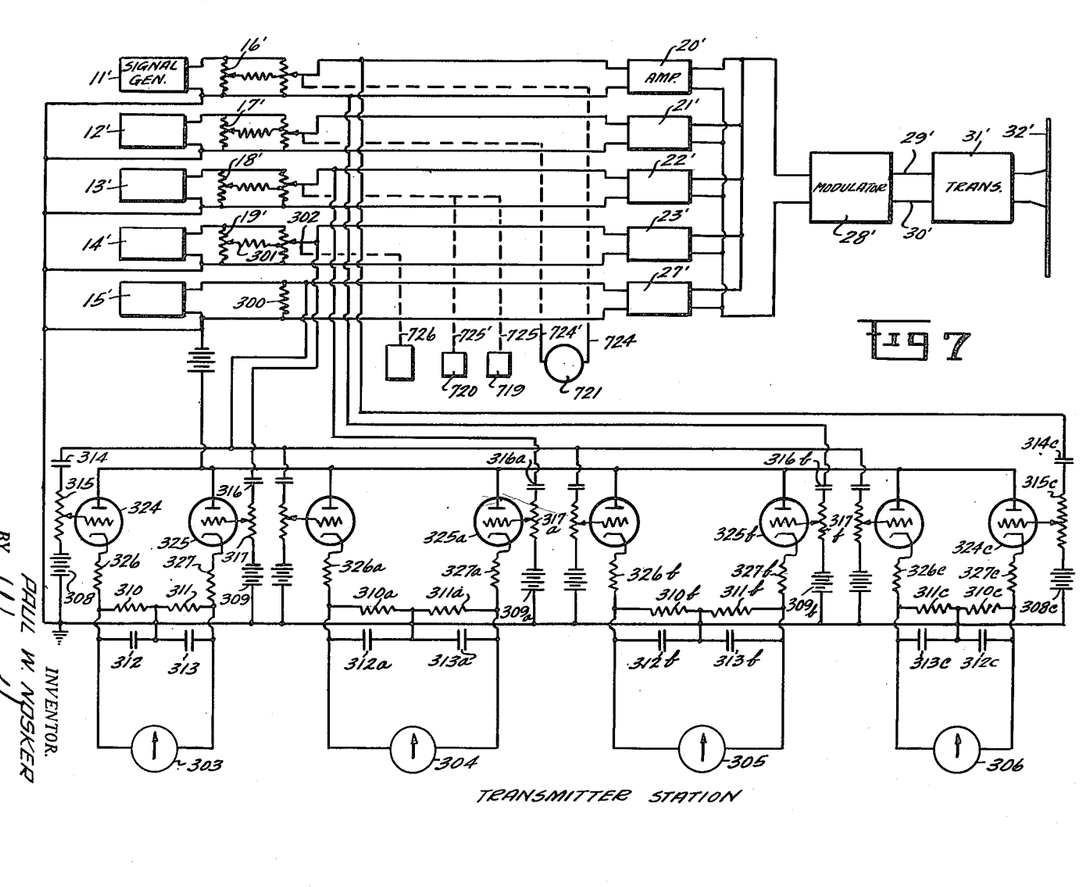
Fig. 7 is a block and schematic diagram of another embodiment of the circuit at the signal transmitting station with setting indicating means and with a trim control as parts thereof.

The circuit diagram of Fig. 7 shows a four-channel radio control transmitting system of the same type as that shown in Fig. 1 and as 722 in Fig. 11, but with two important additions:

a. An electrical trim adjustment by means of which the electrical center of any of the control potentiometers can be shifted to a limited degree to either side of the geometrical center of the potentiometer; and b. Control position indicators on the missile by which the pilot or operator can determine at any time the control position that is being called for by the transmitting system in each of its separate channels.

As in the other transmitting systems previously described, the present arrangement employs five signal generators 11', 12', 13', and 15' which are identified in Fig. 1 as 11, 12, 13, 14, and 15. Each of these signal generators produces a constant frequency and constant amplitude of output, but no two of the frequencies are the same. The signal generators 11' to 14', inclusive, as in the previous showings, apply their outputs to variable potentiometers 16' to 19', inclusive. The signal generator 15' which delivers its output to a constant load resistor 300, produces the standard or reference signal for the system shown in Fig. 7. This signal passes through the amplifier and filter combination 27', thence into the modulator 28', the radio transmitter 31', and is radiated from the antenna 32'. The signal generator 14', which produces another signal, delivers its output to the network consisting of potentiometer 19', resistor 301 and potentiometer 302. The potentiometer 302 is the control element by means of which an operator can obtain at the frequency of generator 14', a signal having an amplitude from zero to the full output of the signal generator. The potentiometer 19' in conjunction with the resistor 301 constitutes the trim adjustment which will be explained later. The output signal from potentiometer 302 passes to a filter and amplifier unit 23' and thence to the same modulator 28', transmitter 31' and antenna 32'.

The other channels following signal generators 11', 12' and 13' are similar to that of 14' except in the matter of frequency. They operate in the same manner to produce control signals that can be separated and individually used at the receiving station. The control position indicators 303, 304, 305, and 306 are zero center, direct-current instruments observable by the pilot at the remote control transmitting station. These instruments are employed in differential vacuum tube voltmeter circuits to measure the relationships between the standard signal amplitude and the adjusted amplitudes of each of the other control signals.

The action of the trim-adjustment potentiometer will be explained with reference to the channel of signal generator 14'. The resistance element of the trim-adjustment potentiometer 19' is connected in parallel with the control potentiometer 302. One end of the range resistor 301 is connected to a center tap on the potentiometer 302 and the other end of this resistor is connected to the movable contact on potentiometer 19'. To examine the operation of this trim-control adjustment, the case in which the movable contact on potentiometer 19' is in the center of that potentiometer, will be first considered. In such case, both ends of the resistor 301 are always at a potential midway between ground and the output potential of the signal generator 14'. Hence, there is no potential difference across resistor 301 and no current flows through it. Under this condition, the presence of potentiometer 19' and resistor 301 has no effect on the control potentiometer 302 and the latter potentiometer maintains linear relationship between geometrical setting and output voltage.

However, if the movable contact on potentiometer 19' is moved to the top position possible in Fig. 7, it will be noted that the resistor 301 is in shunt with the upper half of potentiometer 302. In this condition, the geometrical center of potentiometer 302 is at an electrical potential greater than one half of the total potential output of the signal generator 14'. This maximum setting of potentiometer 19' produces therefore, an electrical center point on potentiometer 302 that is somewhat below the geometrical center of that potentiometer. On the other hand, if the movable contact on potentiometer 19' is placed at the lower end of that potentiometer, then the resistor 301 is in shunt with the lower half of the control potentiometer and thus moves the electrical center of potentiometer 302 above its geometrical center.

When the movable contact on the potentiometer 19' is at any other position than its center or upper or lower limits, the effect is to place unequal shunting resistances across the upper and lower halves of the control potentiometer 302. Thus, the combination of potentiometer 19' and resistor 301 provides for unsymmetrical shunting of the two halves of potentiometer 302, in either sense about the symmetrical condition and thereby furnishes a trim control for the flight control element on the controlled airplane or missile that is actuated by the channel originating in signal generator 14'.

Four separate control position indicator circuits are shown in the lower part of the diagram of Fig. 7. Since all of these indicator circuits are substantially identical, the numerals designating the parts of the other three indicator circuits are the same as those of the first except that they are followed by the letters a, b, and c, respectively. The following explanation will therefore be applied only to the first circuit at the left of Fig. 7. That circuit comprises the indicating meter 303, the vacuum tubes 324 and 325, and associated circuit elements. These vacuum tubes are used in a differential cathode-follower arrangement with each tube initially biased to plate current cut-off so as to produce half-wave rectification of the incoming grid signal. This effect is accomplished by inserting in the cathode circuits comparatively high resistances 326 and 327 to produce essentially full cathode-follower action in the vacuum tubes 324 and 325 and, by initial adjustment of the potentials of the batteries 308 and 309 to produce plate current cut-off in the respective vacuum tubes. The indicating meter 303 is connected across the shunt resistors 310 and 311, each of which is in the cathode circuit of one of the vacuum tubes. The filter condensers 312 and 313 may be connected across the shunting resistors as shown, to smooth pulsations of meter current that otherwise would be caused by the half-wave action of the plate currents in the vacuum tubes. It will be noted that signal voltage from the standard frequency generator 15' is fed through a blocking condenser 314 to the potentiometer 315 which is in the grid circuit of the vacuum tube 324. Similarly, the adjusted output voltage of potentiometer 302, which is in the control circuit of the signal generator 14', is fed through its blocking condenser 316 to the potentiometer 317 in the grid circuit of tube 325.

To illustrate the manner in which the control position indicator 303 is used, let it be assumed that the potentiometer 302 is first placed at the lower limit of its travel, thus delivering zero signal at the frequency of signal generator 14'. Then, as the signal generator 14' has been adjusted to its normal voltage output, the potentiometer 315 is adjusted to a point which gives sufficient grid signal to tube 324 to produce full-scale deflection of the meter 303. Next, the control potentiometer 302 is moved to its top position, thus delivering maximum signal output at the frequency of signal generator 14'. The potentiometer 317 is adjusted to such a point that the indicating meter shows full-scale deflection in the direction opposite to that produced above. After adjustments have been made in this manner, the indicating meter 303 will show deflections which are at all times indicative of the electrical position of the control potentiometer 302. For example, when the potentiometer 302 is set to its electrical center position, the meter 303 will stand at its zero center, thus indicating that the control channel represented by the signal generator 14' is set to produce neutral or center position of the rudder or other controlled element at a remotely-situated receiving station. The main channels as represented by meters 303, 304, 305, and 306 therefore furnish a complete presentation to the pilot of the position settings being called for by the transmitter station for the flight controls of the missile or airplane.

The schematic diagram of Fig. 8 shows a complete radio-controlled receiving station of the general type that has been previously described, but incorporating certain additions and modifications not before illustrated. For simplicity, the diagram shown on Fig. 8 includes only two channels for control. It is to be understood that four or more signal channels, besides the standard or reference channel, generally are to be used. Among the more important new features indicated on this diagram are the following:

a. The follow-up potentiometers 401 and 402 substantially correspond to the follow-up potentiometers 68 to 71, inclusive, in Fig. 2, but 401 and 402 are connected in alternating current circuits ahead of the rectifiers 411 to 414, inclusive, in Fig. 8, rather than in the direct current circuits following the rectifiers 55 to 59, inclusive, as are potentiometers 68 to 71, inclusive in Fig. 2;

b. Thermionic full-wave rectification is used instead of the dry-disc type shown in Figs. 2, 4, and 10;

c. Gas-filled electronic tubes are used as sensitive relay devices;

d. A hydraulic servo system is shown in place of the electric motor servos indicated in the preceding figures;

e. An anticipating or anti-hunting circuit is included;

f. The system includes a throw-out switch by which a human pilot or operator can quickly throw the complete remote control system into or out of operation; and g. Signal lamps are provided to indicate to a human check pilot when the transmitter station is calling for control settings different from those existing on the controlled airplane or missile.

Major subdivisions of the control-receiving system of Fig. 8 will be mentioned briefly and will be followed by detailed description of one of the two channels shown. The other channel operates in a similar manner.

The antenna 40' receives a modulated radio wave from any one of the transmitting stations shown in the drawings. The receiver 41' demodulates the radio wave and delivers the combined modulation frequencies to the inputs of the three filters 45', 46', and 47', which are connected in parallel. These filters are of the band-pass type and are individually adjusted to pass the frequencies corresponding to outputs of signal generators 13, 14, and 15 at the transmitting station (Fig. 7). The output of filter 47', which is the standard or reference signal, is applied across the two follow-up potentiometers 401 and 402 which are in parallel. The output of the follow-up potentiometer 402 is applied through an amplifier 403 to the primary winding of the transformer 404 and the output of the other follow-up potentiometer 401 is similarly connected to its transformer 405 through amplifier 406.

The output of the filter 46 is connected directly through the amplifier 407 to the primary winding of the transformer 408 and the output of the filter 45 is similarly applied through amplifier 409 to the primary winding of its transformer 410. The secondary winding of each of the transformers 410, 405, 408, and 404 is connected to a vacuum tube 411, 412, 413, or 414, respectively, in a conventional full-wave rectification circuit that includes a fixed load resistor 415, 416, 417, or 418. These rectification circuits are grouped in pairs, one variable-amplitude control channel being paired with one reference channel, and the two load resistors of each pair (for example 415, and 416) are connected in polarity opposition across a resistive network 419, 420 having its midpoint grounded. Gas-filled electronic tubes 421, 422, 423, and 424 have their control grids connected to the resistive network on opposite sides of its neutral or ground point, and these tubes are thus differentially controlled by the rectified signals. In the plate circuit of each of the gas-filled electronic tubes is a relay winding 425, 426, 427, and 428 which closes a corresponding relay switch 480', 480, 481', and 481, respectively, when the associated one of the above tubes is rendered conducting by an increment of positive signal applied to its grid. One contact Y of each of these relays 480, 480', 481 and 481', is an open contact. Each of the relays 480' or 481', when closed downwardly and relays 480 and 481, when closed upwardly, energizes a winding and thus opens one or more solenoid-operated hydraulic valves 429 to 438, inclusive, which control the motion of hydraulic servos 439, 440. Finally, each one of the hydraulic servos 439 and 440 is connected by some suitable mechanical linkage such as a flexible cable and pulley arrangement (not shown) to the rudder (not shown) or to some other controlled element on the missile or airplane.

For a more detailed analysis of the operation of this remote control system, the channel represented by filter 46' leading to the hydraulic servo 439 will be considered. The other control channel through the filter 45' and leading to the servo 440 is substantially a duplication of the channel through the filter 46'.

Before the system is placed in operation, a source of alternating current power is connected to the A. C. terminals on transformers 441, 442, 443, and 444. Next, cathode bias for the gas-filled electronic tubes 421, 422, 423, and 424 is separately adjusted by the potentiometers 445, 446, so that each tube is nonconducting and the relays 480', 480, 481' and 481 are therefore open when no controlling signals are being received through the filters 47', 46', and 45'. Positive bias applied to each such cathode should be only slightly greater than that required to render the tube nonconducting, so that tube conductivity can be achieved by application of a small increment of positive grid signal. After this initial adjustment has been made, the system is ready for operation and the receiver may be switched on.

The standard signal is received through the filter 47 at a fixed and constant amplitude, and the controlling signal is received through its filter 46' at an amplitude which may be varied at the transmitting station by the potentiometer 302 of Fig. 7. Let it be assumed that the amplitude of the controlling signal through 46' is set at maximum and is equal to the total amplitude of signal through the reference channel 47'. Let it also be assumed that the controlling potentiometer 302 on Fig. 7 is set at its midpoint. The incoming signal through amplifier 407 is rectified by the tube 413 and is thus converted into a D. C. potential across the load resistor 416 with the polarity as shown. Similarly, the other signal through amplifier 403 is rectified by the tube 414 and appears as a direct potential across the load resistor 415. In this case, the voltage across resistor 416 is twice that across resistor 415 because of the assumed setting of the potentiometer 302.

Since the resistors 415 and 416 are effectively connected in parallel, a current will flow through the resistive network 419 comprising resistors 449, 450, 451, and 452, and the direction of this current flow will be such as to make the top of resistor 452 positive with respect to ground and the bottom of resistor 450 negative with respect to ground. The resistor 451 and condenser 453 serve as a filter to produce essentially pure D. C. through the resistor 452 and the resistor 449 with condenser 454 serves the same purpose with respect to resistor 450. The negative potential at the bottom of resistor 450 is applied through the resistor 463 to the control grid of tube 421 and thus provides additional bias on this tube in the direction of nonconductance. On the other hand, the positive potential at the top of the resistor 452 is applied through resistor 455 to the control grid of tube 422 and produces an effect opposite to that of the initially-applied positive cathode bias and serves to render tube 422 conductive when positive half-cycles of plate voltage are applied through the transformer 442.

The resistor 455 is introduced into the grid circuit of tube 422 to limit grid current to a negligible value during conducting half-cycles in that tube. Rendering the tube 422 conductive results in the closing upwardly of relay 480 which thereby energizes and opens solenoid-operated valves 429 and 432. A resistor 456 in the plate circuit of tube 422 serves to limit maximum plate current through that tube to a safe value. Opening of the valve 429 admits hydraulic fluid to the bottom of the servo 439, and the simultaneous opening of valve 432 connects the top of the same servo to the hydraulic reservoir. This sequence of events causes the servo 439 to move the servo piston rod 457 in a direction to produce a desired result such as "down" motion of a control element on the missile or airplane.

The foregoing description shows how the servo is caused to move and the direction of that motion. The next matter to be considered is how far the servo will move and under what conditions it will assume a fixed position. The follow-up potentiometer 402 is mechanically connected to the movable piston of the servo 439 as indicated by a dashed line 482 in such a manner that these two elements move together and have coincident limits of travel. The mechanical linkages 482 and 483 connect the hydraulic pistons 457 and 484, with their follow-up potentiometers 402 and 401, respectively. Recalling that a servo motion was initially produced because the signal through amplifier 407 was greater than that through amplifier 403, it will be seen that movement of the potentiometer 402 toward its upper limit will increase the signal through amplifier 403 and thus tend to establish equality of the voltages developed across load resistors 415 and 416.

Since the signals through filters 46' and 47' were assumed to be equal, it is apparent that the signal through amplifier 403 will be equal to that through amplifier 407 when the potentiometer 402 is at its extreme upper position. Placement of potentiometer 402 in its extreme upper position produces equality of voltage across resistors 415 and 416, reduces to zero the current through resistors 450 and 452 and thus removes all grid signals from the gas-filled electronic tubes 421 and 422. When this condition is reached, relay 480' remains open, relay 480 opens, thus closing solenoid-operated valves 429, and 432, and the servo 439 is stopped and hydraulically locked in position. Therefore, proper mechanical linkage between the servo 439 and the follow-up potentiometer 402 is that in which the maximum "down" position of the control element on the airplane corresponds to the maximum "up" position of the potentiometer 402. Similarly, the maximum "up" position of the control element on the airplane should correspond to the maximum "down" position of the potentiometer 402. With the follow-up potentiometer connected in this manner, servo motion always moves the follow-up potentiometer in a direction tending to establish equality of signals through amplifiers 403 and 407. Servo motion stops when that equality is established. The system automatically adjusts a follow-up potentiometer 402 to pick off a definite fraction of the standard signal through filter 47' and that fraction is equal to the amplitude ratio of signals sent through the amplifier elements 23' and 27' of the transmitting system in Fig. 7.

To illustrate the opposite direction of servo motion, it is convenient to consider the condition in which the controlled element on the airplane is in its full "down" position and the follow-up potentiometer 402 is in its full "up" position. If the controls at the transmitting station are then manipulated in such a manner that the amplitude of signal through filter 46' of Fig. 8 is reduced to one half of its former (maximum) value, the voltage developed across resistor 415 will be twice that developed across resistor 416. The bottom of resistor 450 will be positive with respect to ground and the top of resistor 452 will be negative with respect to ground. This situation causes the tube 421 to become conducting, closes the relay 480' downwardly, opens the solenoid-operated valves 430, 431, introduces hydraulic pressure into the upper end of the servo 439, connects the lower end of the servo to the hydraulic reservoir and thus causes the controlled element on the airplane to move upward from its full "down" position. It is evident that equality of signals through amplifiers 403 and 407 will be established, hence, servo motion will be stopped when the follow-up potentiometer 402 reaches its midpoint because it will then be picking off 50 per cent of the standard signal through filter 47'. Therefore, the controlled element on the airplane will come to rest in its center or neutral position. The dashed lines 482 and 483 which bear the legend "Mechanical linkage" indicate a drive for the potentiometers similar to that illustrated and described in relation to Figs. 5 and 6.

In regard to the biasing system employed for the gas-filled electronic tubes 421 and 422, particularly with reference to the anticipating or anti-hunting circuit referred to previously as modification (e) contained in Fig. 8, the operation is as follows: Bias voltage is supplied by the battery 472 through the voltage-dividing circuits consisting of resistor 459, resistor 460, potentiometer 446 and resistor 464 for tube 22. The circuit just mentioned is used to provide constant but adjustable cathode bias to these tubes. It will be noted that the resistor 459 is common to both of the cathode biasing circuits and is also connected through resistors 465 and 466 to the relay contacts adjacent the relay windings 425 and 426, respectively. When either relay winding 425 or 426 is energized, the positive terminal of battery 458 is connected through resistor 465 or 466 to the resistor 459 at its junction with resistors 462, and 460. The closure of relay 480 or 480' produces from battery 458 an increment of current in addition to that from battery 472 through resistor 459 because the battery 458 and resistor 459 have a common ground connection at their negative ends, and thereby apply an additional increment of positive bias to the cathodes of both tubes 421 and 422. The effect of this action is to bias both of these tubes 421 and 422 farther in the direction of nonconductance, thus requiring a greater amount of positive grid signal to maintain relay closure. It must be understood that after a relay has closed and a servomotor has started to move its follow-up potentiometer, there is a small but unavoidable delay between the attainment of equal signals in amplifiers 403 and 407 and the actual stoppage of servo motion. This delay is due to time constants of the various parts of the electrical circuit, to the time required for relay opening, to the time required for the solenoid-operated valves to close and perhaps to other factors.

The practical result is that if no anticipating circuit were provided, the follow-up potentiometer 402 would be driven past its proper balance point before the balance condition could exert its effects to stop the servo. Such overshooting could produce errors in the final resting point of the controlled element on the airplane, and, if serious, would result in continuous oscillation of the controlled element. With the anticipating or anti-hunting circuit in operation, however, the cathode bias and grid bias conditions on the gas-filled electronic tube necessary for relay opening are established before the follow-up potentiometer 402 has reached its electrical balance position. Values of resistors 459, 465, and 466 can be chosen so that, with a given voltage of the battery 458, a proper amount of anticipation will be obtained for any given speed of servo movement. In any given installation, servo operating speed does not ordinarily change after having been initially set to a suitable value. The polarity of the increment of cathode bias applied by this anticipating circuit is the same regardless of the direction of servo motion.

A switch 467 which is an eight-pole, double-throw switch, the arms of which are ganged as shown by the dashed line 485, is provided as an illustration of the modification (f) included in Fig. 8. By the use of the switch 467, the entire remote control system may be thrown in or out of operation at the discretion of a human pilot in the remotely controllable airplane. When the switch is closed downwardly as shown in Fig. 8, the remote control system is fully engaged and operable as described above. However, when this switch is closed upwardly, the servo-actuating valves 429, 430, 431, and 432 are disconnected from their ground-return circuit to the battery 458 and therefore cannot be operated by closure of their associated relays 480', 480, 481' and 481. Also, closing of the switch 467 upwardly energizes and thereby opens the solenoid-operated valve 433 which serves to by-pass and hence to unlock hydraulically the servo 439. The closing upwardly of switch 467 renders the remote-control system ineffective and at the same time frees the hydraulic servo system so that the controls on the airplane can be manually operated by a human pilot in the conventional manner.

Signal lamps 468, 469, 470, and 471 are provided, two in each channel of the remote control system to indicate to a human check pilot in the remotely controllable airplane when the remote control system produces relay closure of any of the relays 480 or 481 upwardly or 480' or 481' downwardly and thereby calls for servo motion. The signal lamp 470 is energized by the closure downwardly of relay 480' and hence shows when the remote-control system is calling for "up" motion of a control element on the airplane. Similarly, the signal lamp 471, which is energized by the closure of relay 480, shows when the remote control system is calling for "down" motion of the same control element on the airplane. When the system is operating properly, it is impossible for both signal lamps of any given pair to be turned on at the same time. In a similar manner, a closing upwardly of relay 481 applies the potential of battery 458 across the filament of lamp 468 and when the relay 481' is closed downwardly, the potential of battery 458 is applied across the filament of lamp 469.

The chief practical use of the signal lamp system is to indicate to a human check pilot in the controlled plane when he may safely switch over from manual to remote control. For example, if an airplane has been taken aloft by conventional manual control and if it is then desired to switch over to remote control from a ground-based or airborne transmitter station, it is desirable that the controlling potentiometers at the transmitting station be set in positions corresponding to the actual positions of the controlled elements on the airplane before the changeover is made. If this condition were not satisfied, more or less violent reactions of the airplane would result when the airplane controls adjusted themselves to the settings defined by the transmitting station. Therefore, the normal procedure is for the human check pilot on the controlled airplane to instruct the pilot at the control station through radio communication to readjust his transmitting controls so that all signal lamps on the controlled airplane are "off," indicating that all controls are set as required by the transmitter station. When that condition is attained, it signifies that the remote control system is not calling for any change of servo position on the controlled airplane and therefore, no immediate change of airplane attitude will result from a switch-over from manual to full remote control. The various signal lamps used are preferably of distinctive colors and are so-placed and identified that the check pilot on the controlled airplane can tell at a glance which controls are being energized by the remote control system and the direction of motion that is being called for in each case. All signal lamps are fully operative regardless of the position of the switch 467.

Figure 9:
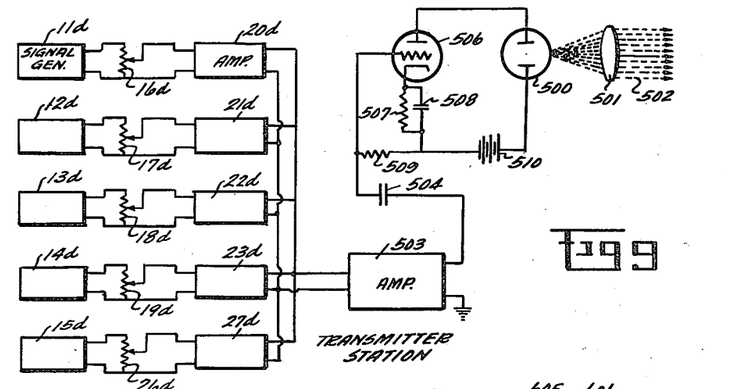
Fig. 9 is a block and schematic diagram of the circuit of a transmitter station similar to that shown in Fig. 1 with the difference that it is made to radiate light waves instead of radio waves.

Fig. 9 is a diagram of a remote control transmitting system that is similar to Fig. 1 except for the means by which the combined controlling signals are radiated into space. The relationship between Figs. 1 and 9 is indicated by corresponding numerals with the letter "d" added. In Fig. 1, the several controlling signals were combined and then were radiated as modulation on a radio frequency carrier wave, whereas in Fig. 9 the combined controlling signals are amplified and then applied to a generator of light, such as a gaseous glow-discharge tube 500, and are then transmitted through an optical system 501 as modulation on a light beam 502. In the system of Fig. 9, the several signal generators, controlling potentiometers, and isolating amplifiers, and the combined modulation amplifier 503 operate in substantially the same manner described in connection with Fig. 1.

The combined signals at the output of the amplifier 503 are fed through the blocking condenser 504 to the control grid of the vacuum tube 506. The cathode resistor 507 in the circuit of the vacuum tube 506 is provided in the usual manner to generate appropriate cathode bias for operation of that vacuum tube on the linear portion of its characteristic curve, and the by-pass condenser 508 is connected across resistor 507 to provide a low-impedance path for the dynamic components of cathode current. The resistor 509 is connected in the conventional manner to provide a direct current return circuit from the control grid to ground. A battery 510 provides, through the tube 500, cathode-to-plate potential difference for the vacuum tube 506 in the usual manner. The gaseous glow-discharge tube 500, which may be a neon tube, is inserted in the plate circuit of the vacuum tube 506 in a manner such that the plate current flows through the discharge tube 500 and thus generates light rays whenever the vacuum tube 506 is conducting. The gaseous glow-discharge tube 500 should be one in which the intensity of the generated light is proportional to the electric current passing through that tube.

To illustrate the operation of this transmitting system, let it be assumed first that the cathode heater (not shown) of the vacuum tube 506 is fully energized, and that no grid signal is being impressed through the condenser 504. In this condition, the value of resistor 507 should be adjusted so that the grid bias with respect to cathode is midway between zero and the maximum negative value for linear variation with plate current. Under this condition, the plate current on vacuum tube 506 will be set at its normal value, and the intensity of light emitted by the gaseous-glow-discharge tube 500 will be midway between its maximum and minimum values. Now, if the signal generators, amplifiers, and all other parts of the circuit are placed in operation, a composite alternating voltage wave containing, in general, five different frequency components originating in the five separate signal generators, will be transmitted through the condenser 504 to the control grid of the vacuum tube 506. Due to the well known plate-current-versus-grid-voltage characteristics of a vacuum tube such as 506, the current through the gaseous-glow-discharge tube will vary in accordance with the instantaneous values of signal voltage applied to the control grid and will thus produce changes of intensity of light radiated from the discharge tube 500. Positive increments of signal voltage applied to the control grid or vacuum tube 506 will cause increases of the plate current and hence, increases of light intensity from the gaseous-glow-discharge tube 500. Similarly, negative increments of signal voltage applied to the control grid of vacuum tube 506 will decrease the intensity of light from the glow-discharge tube 500.

Under the stated conditions in which plate current in the vacuum tube 506 is a linear function of applied grid voltage and in which intensity of radiated light from the gaseous-glow-discharge tube 500 is a linear function of the current conducted through that tube, the radiated light intensity will be a time function corresponding to the composite voltage signal wave applied to the control grid of vacuum tube 506. A suitable optical system 501, here represented by a converging lens, may be employed to direct the modulated light in a beam of essentially parallel rays for maximum effective distance of transmission and for maximum security against unwanted interception. Modulation of the light beam 502 so produced, is used to effect control of the missile or airplane.

Figure 10:
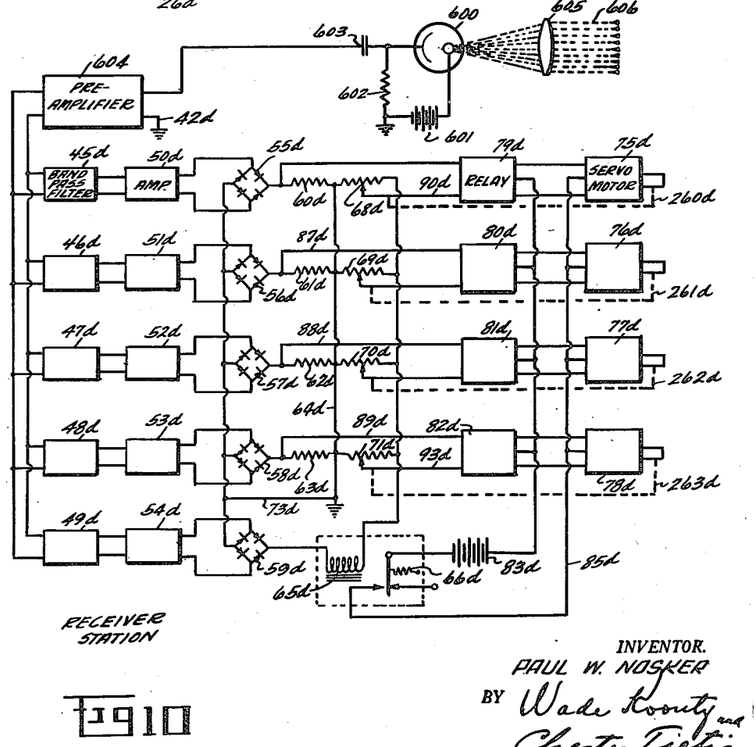
Fig. 10 is a block and schematic diagram of a control receiving station similar to that shown in Fig. 2 with the difference that it is responsive to light waves instead of to radio waves.

Fig. 10 is a diagram of a circuit at the receiving station by means of which the modulated light beam from the transmitting system of Fig. 9 may be intercepted and converted into electrical signals which, in turn, may be separated and channeled to individual servomotors or other control actuating devices on the missile or controlled airplane. In the circuit of Fig. 10, the relationship between it and Fig. 2 is indicated by corresponding numerals with the letter "d" added. A converging lens 605 focuses the received light beam 606 upon the cathode surface of a photo-electric cell 600, which is here shown as a high-resistance, emissive type. Potential difference across the photo-electric cell 600 is maintained by the battery 601 which is connected in series with the load resistance 602. Incident light upon the cathode of the photo-electric cell 600 causes current to flow through the circuit just mentioned, and thus produces voltage drop across the resistor 602. The characteristics of the photo-electric cell employed should be such that changes of intensity of the incident light will produce proportional changes of potential drop across the load resistor 602. Under these conditions, the dynamic component of potential difference across the resistor 602 will be a reproduction of the modulation signal applied to the light beam at the transmitting station. This reproduced signal may be transferred through the blocking condenser 603, the preamplifier 604 to the same filter circuits and subsequent circuits previously described in connection with Fig. 2. Such circuits govern the servomotors 75d to 78d, inclusive, in the manner previously described, for the purpose of actuating the controls on the missile or controlled airplane.

Fig. 11 has previously been described as an overall presentation of the remote control system disclosed herein.

Modifications may be made in the circuits and combinations disclosed herein without departing from the spirit of the invention, for example, the carrier wave transmitter or equivalent and the carrier wave receiver or equivalent may be eliminated from the combination. A wire connection would in such case run directly from the transmitter station to the receiver station and combine the transmitter and receiver to serve as a wired remote control system. Such a wire connection could be shown by a line connecting the output of amplifier 503 of Fig. 9 with the input to preamplifier 604 of Fig. 10. For such use, the elements which would in the absence of the wire radiate and receive the carrier wave could then be eliminated.

The invention claimed is:

1. In a transmitting system for the remote control of missiles, a generator of reference signal having output leads, a plurality of generators of control signal, each of said generators having output leads and producing an output wave of constant frequency and constant amplitude, no two frequencies being the same, a constant load resistor connected across the output leads of the reference signal generator, a first potentiometer and a second potentiometer for each control signal generator, each potentiometer being connected across the output leads of its generator of control signal, a resistor connected between a movable tap on each first potentiometer and a fixed tap on the respective second potentiometer, the variable tap on the first potentiometer constituting means to provide for unsymmetric shunting of the halves of the second potentiometer whereby to make the electrical center of the second potentiometer differ from its geometrical center in order to produce a trim control for the controlled missile, a mixing circuit connected to the output terminals of said second potentiometer for each control signal generator and to said load resistor, means under the control of an operator whereby the second potentiometer may be actuated to vary from zero to maximum that fraction of the output of its signal generator intended for delivery to the mixing circuit, a modulator connected to the mixing circuit, and a radio transmitter coupled to the modulator and to an antenna.

2. A control signal transmitting system adapted for the radio guidance of a missile or a guidable airplane provided with a control-actuating receiver adapted to receive and be actuated by signals from said control signal transmitting system, said system comprising a plurality of single-frequency signal generators to produce a graduated set of frequencies, each generator having output leads, a fixed load resistor, one of said generators being connected by its leads directly to said fixed load resistor to provide a reference signal, at least one of the remaining signal generators having a first potentiometer and a second potentiometer connected across its output leads, a fixed tap on the winding of said second potentiometer at substantially the geometrical mid-point thereof, a variable tap on the first potentiometer connected to said fixed tap on the second potentiometer, said variable tap being under the control of an operator for varying the setting of the first potentiometer between maximum and minimum to provide for unsymmetrical shunting of the second potentiometer, whereby to make the electrical center of the second potentiometer different from its geometrical center in order to produce a trim control for said guidable missile or airplane, a mixing circuit connected to the output sides of the second potentiometers, a modulator connected to the mixing circuit, and a radio transmitter coupled to the modulator and to an antenna.

PAUL W. NOSKER.

REFERENCES CITED

The following references are of record in the file of this patent:

UNITED STATES PATENTS

| Number | Name | Date |
|---|---|---|
| 2,184,075 | Goldstein | Dec. 19, 1939 |
| 2,382,709 | Greene et al. | Aug. 14, 1945 |
| 2,385,657 | Stettler | Sept. 25, 1945 |
| 2,388,748 | Kopetzky | Nov. 13, 1945 |
| 2,397,475 | Dinga | Apr. 2, 1946 |
| 2,397,477 | Kellogg | Apr. 2, 1946 |
| 2,441,568 | Finison | May 18, 1948 |
| 2,490,844 | Sorensen | Dec. 13, 1949 |